United States Patent
Pathare et al.

(10) Patent No.: US 12,041,932 B2
(45) Date of Patent: Jul. 23, 2024

(54) ANTIMICROBIAL COMPOSITIONS

(71) Applicant: Melzer Chemicals Pvt. Ltd., Pune (IN)

(72) Inventors: Prakash Pathare, Pune (IN); Sheeba Swaminathan, Pune (IN)

(73) Assignee: MELZER CHEMICALS PVT. LTD., Pune Maharashtra (IN)

( * ) Notice: Subject to any disclaimer, the term of this patent is extended or adjusted under 35 U.S.C. 154(b) by 0 days.

(21) Appl. No.: 18/167,124

(22) Filed: Feb. 10, 2023

(65) Prior Publication Data
US 2023/0189801 A1  Jun. 22, 2023

(30) Foreign Application Priority Data
May 2, 2022  (IN) .............................. 202221025637

(51) Int. Cl.
| | | |
|---|---|---|
| *A01N 33/12* | (2006.01) | |
| *A01N 25/04* | (2006.01) | |
| *A01N 25/24* | (2006.01) | |
| *A01N 25/30* | (2006.01) | |
| *A01P 1/00* | (2006.01) | |
| *D06M 13/148* | (2006.01) | |
| *D06M 13/463* | (2006.01) | |
| *D06M 15/263* | (2006.01) | |
| *D06M 16/00* | (2006.01) | |

(52) U.S. Cl.
CPC ............ *A01N 33/12* (2013.01); *A01N 25/04* (2013.01); *A01N 25/24* (2013.01); *A01N 25/30* (2013.01); *A01P 1/00* (2021.08); *D06M 13/148* (2013.01); *D06M 13/463* (2013.01); *D06M 15/263* (2013.01); *D06M 16/00* (2013.01); *D06M 2200/20* (2013.01)

(58) Field of Classification Search
CPC ........ A01N 33/12; A01N 25/04; A01N 25/24; A01N 25/30; A01N 25/10; A01P 1/00; D06M 13/148; D06M 13/463; D06M 15/263; D06M 16/00; D06M 2200/20
See application file for complete search history.

(56) References Cited

U.S. PATENT DOCUMENTS 10,980,230 B2 *  4/2021  Sehgal ................... A01N 25/10
2003/0109411 A1 *  6/2003  Kilkenny ............. C11D 3/3746
510/438

FOREIGN PATENT DOCUMENTS

CN         105463836  A  *  4/2016  ............ D06M 13/00

OTHER PUBLICATIONS

Barbara Simoncic and Brigita Tomsic, "Structures of Novel Antimicrobial Agents for Textiles—A Review", Textile Research Journal, 2010, vol. 80(16): 1721-1737. (Year: 2010).*
CN 105463836 A machine translation (Year: 2016).*

* cited by examiner

Primary Examiner — John Pak
Assistant Examiner — Nathan W Schlientz
(74) Attorney, Agent, or Firm — FisherBroyles, LLP; Susan M. Oiler

(57) ABSTRACT

Disclosed is a method for formulating an antimicrobial composition. The method comprises treating a quaternary ammonium salt (QAS) in a reaction mixture. The QAS is one or more of didecyl dimethyl ammonium chloride, dioctyl dimethyl ammonium chloride, ethyl benzyl dimethyl ammonium chloride, cetyl dimethyl ammonium bromide, and dioctyl dimethyl ammonium sulphate, octyl decyl dimethyl ammonium chloride, pyridium QUAT, and a combination thereof. The method further comprises reacting the QAS with one or more binders in the reaction mixture. The binder is a reactive polymeric compound, an aqueous aliphatic polyurethane emulsion, an aqueous acrylic polymer, a modified acrylic polymer, a methacrylate polymer, a reactive polyhexamethylene biguanide (PHMB), an aqueous polydiallyl dimethyl ammonium chloride (DADMAC) polymer, or a certain combination thereof. Finally, the method comprises stabilizing the reaction mixture with one or more stabilizing agent. The stabilizing agent is selected from a group of glycol.

6 Claims, 1 Drawing Sheet

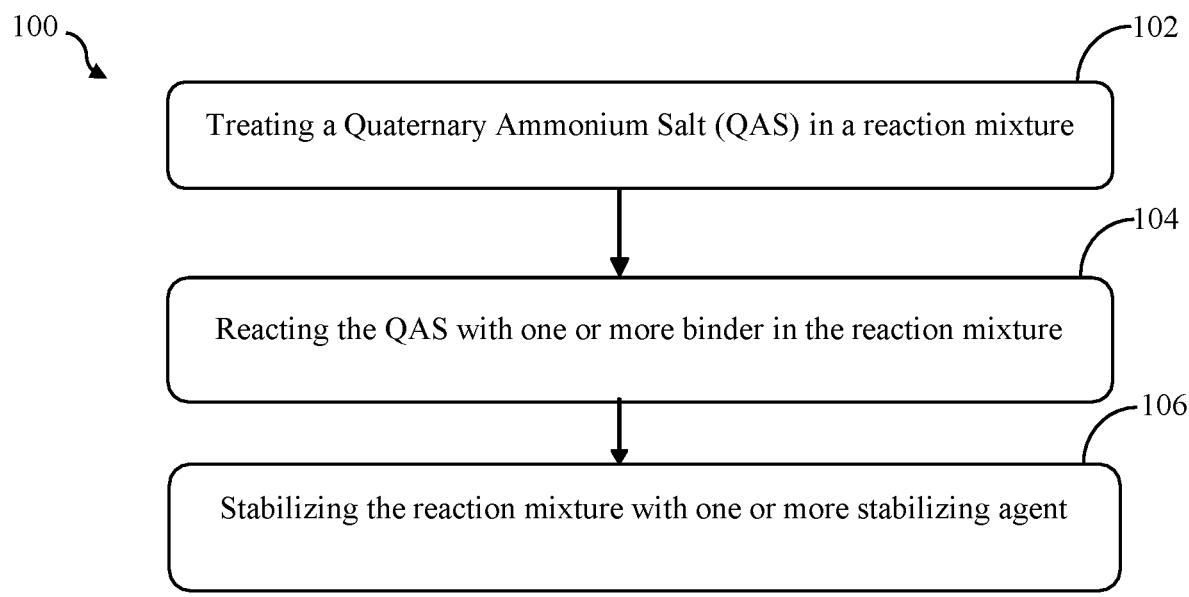

ANTIMICROBIAL COMPOSITIONS

PRIORITY INFORMATION

The present application claims priority from the Indian patent application numbered 202221025637 filed on May 2, 2022 in India.

TECHNICAL FIELD

The present subject matter described herein, in general, relates to antimicrobials. More particularly, the disclosure relates to antimicrobials, synthesis methods and uses thereof.

BACKGROUND

In recent times, there has been rise in demand for antimicrobial products for varying application-usages. A few have been oriented towards better hygiene, for achieving personal as also community health and safety. Generally, antimicrobial products demonstrate only transient antimicrobial properties conferred by an antimicrobial agent. It means, antimicrobial characteristics lasting up to a limited time after those have been put to the usage.

Antimicrobial products particularly garnered lot of interest in Covid-19 pandemic for arresting the spread of infection. Several investigations are being done for antimicrobial products having long-duration effective application-usages and efficacies. Thus, whatever helps to maintain best hygiene became subjects of probing and the context became critical surfaces and textiles which would allow the transmission of the infectious species if those are not brought under control, or made almost free of such microbes dwelling on them.

Further, products like antimicrobial textiles, antimicrobial apparels, medical wear, antimicrobial paints, and the like are being probed whether those could offer far extended protection from the likely transmission of microbial infections. However, certain challenges are being faced on them, from the view of ease of converting them to hold long-duration microbe-resistant property as also on formulating suitable antimicrobial products for them. The most prominent hurdle has been the threat from the likely tailing toxicity from such products to human and by way of leaching of antimicrobial agents from such surfaces and getting entry into the environment, thereby causing damage to the overall balance of the environment. Thus, there is a requirement for developing a sustainable and environment friendly antimicrobial compositions. This is the subject of the present Application.

SUMMARY

Before the present system(s) and method(s), are described, it is to be understood that this Application is not limited to the particular system(s), and methodologies described on this subject, as there can be multiple possible embodiments which are not expressly illustrated in the present disclosure. It is also to be understood that the terminology used in the description is for the purpose of describing the particular implementations or versions or embodiments only and is not intended to limit the scope of the present Application. This summary is provided to introduce aspects related to a system and a method for formulating an antimicrobial composition. This summary is not intended to identify essential features of the claimed subject matter nor is it intended for use in determining or limiting the scope of the claimed subject matter.

In one implementation, an antimicrobial composition is disclosed. The antimicrobial composition may comprise a quaternary ammonium salt (QAS). It may be understood that the QAS is one or more of a didecyl dimethyl ammonium chloride, a lauryl myristyl dimethyl ammonium chloride, a dioctyl dimethyl ammonium chloride, an ethyl benzyl dimethyl ammonium chloride, and a combination thereof. Further, the antimicrobial composition may comprise a binder. It may be understood that the binder is selected from a group of reactive polymeric compounds, an acrylic polymer, a modified acrylic polymer, reactive polyhexamethylene biguanide (PHMB), aqueous polydiallyl dimethyl ammonium chloride (DADMAC) polymer, an aliphatic polyurethane, and a combination thereof. Finally, the antimicrobial composition may comprise a stabilizing agent. It may be understood that the stabilizing agent is selected from a group of glycol and glycol ether comprising propylene glycol, polyethylene glycol, dipropylene glycol, butyl cellosolv and a combination thereof.

In another implementation, a method for formulating an antimicrobial composition is disclosed. Initially, a quaternary ammonium salt (QAS) may be treated in a reaction mixture. It may be understood that the QAS is one or more of didecyl dimethyl ammonium chloride, lauryl myristyl dimethyl ammonium chloride, dioctyl dimethyl ammonium chloride, ethyl benzyl dimethyl ammonium chloride, cetyl dimethyl ammonium bromide, and dioctyl dimethyl ammonium sulphate, octyl decyl dimethyl ammonium chloride, pyridinum QUAT, and a combination thereof. The reaction mixture may be aqueous in nature, may be semisolid and may be treated at a first temperature of 40° C. to 50° C. for a first time interval of 1 to 4 hours. It may be understood that the QAS provides an ammonium cation to bind to an anionic site in a controlled environment and wherein a polar hydrogen in the QAS is capable to attach to a binder. Further, the QAS may be reacted with one or more binder in the reaction mixture. The binder may be a reactive polymeric compound, an aqueous aliphatic polyurethane emulsion, an aqueous acrylic polymer, a modified acrylic polymer, a methacrylate polymer, a reactive polyhexamethylene biguanide (PHMB), an aqueous polydiallyl dimethyl ammonium chloride (DADMAC) polymer, or a certain combination thereof. Further, a molecular weight of the binder may be lower than a threshold value and the QAS may be reacted at a second temperature of 65° C. to 75° C. for a second time interval of 2 to 4 hours. In one aspect, the binder binds to the QAS in the controlled environment. It must be understood that the controlled environment is optimized for each of the QAS and each of the binder in the reaction mixture. Finally, the reaction mixture may be stabilized with one or more stabilizing agent. The stabilizing agent may be selected from a group of glycol and the reaction mixture may be stabilized at a third temperature of 40° C. to 60° C. for a third time interval of 1 to 3 hours. The resultant product may be diluted further by water.

BRIEF DESCRIPTION OF THE DRAWINGS

The foregoing detailed description of embodiments is better understood when read in conjunction with the appended drawings. For the purpose of illustrating of the present subject matter, an example of a construction of the present subject matter is provided as FIGURES, however, the invention is not limited to the specific method for formulating an antimicrobial composition, disclosed in the document and the FIGURES.

The present subject matter is described in detail with reference to the accompanying figures. In the FIGURES, the left-most digit(s) of a reference number identifies the FIGURE in which the reference number first appears. The same numbers are used throughout the drawings to refer to various features of the present subject matter.

FIG. 1 illustrates a method for formulating an antimicrobial composition, in accordance with an embodiment of the present subject matter.

The FIGURES depict an embodiment of the present disclosure for purposes of illustration only. One skilled in the art will readily recognize from the following discussion that alternative embodiments of the structures and methods illustrated herein may be employed without departing from the principles of the disclosure described herein.

DETAILED DESCRIPTION

Some embodiments of this disclosure, illustrating all its features, will now be discussed in detail. The words "treating," "digesting, "assessing," and other forms thereof, are intended to be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise. Although any system and methods similar or equivalent to those described herein can be used in the practice or testing of embodiments of the present disclosure, the exemplary, system and methods are now described. The disclosed embodiments are merely examples of the disclosure, which may be embodied in various forms.

Various modifications to the embodiment will be readily apparent to those skilled in the art and the generic principles herein may be applied to other embodiments. However, one of ordinary skill in the art will readily recognize that the present disclosure is not intended to be limited to the embodiments described but is to be accorded the widest scope consistent with the principles and features described herein.

In recent times, there has been a huge demand for an antimicrobial composition that is effective, stable, and safe to use on textiles. Further, antimicrobial finishing of textiles has become extremely important in the production of protective, attractive, and technical textiles products. Apart from the use of technical textiles, there has also been demand for antimicrobial daily wear apparels. Several challenges are faced in developing an antimicrobial composition ideal for the antimicrobial textiles of daily wear.

One of the main technical challenges is providing long lasting antimicrobial properties of treated textiles showing the activity against a wide range of damage-causing microbial species.

Further, the challenge is to ensure such antimicrobial activity in the mixed presence of multiple microbial species existing together.

Furthermore, the challenge towards the long-lasting activity is reducing high-water solubility of the conventional antimicrobial agents once transferred on textiles and restricting its leaching out on every wash to the environment.

Another technical challenge is from the textile which quickly reduces the antimicrobial properties in a first few washes of the antimicrobial textiles, which means such textiles mostly need to get overloaded by antimicrobial agents so as to obtain antimicrobial properties of the treated textiles.

The present invention aims to address the above-mentioned technical challenges by providing an antimicrobial composition that is least leaching but at the same time environment friendly.

Another technical challenge is to avoid development of antimicrobial resistance in the micro-organisms once the available concentration of the antimicrobial agent on textiles depletes by its wash-out, such that the low concentration falls below certain inhibiting concentration required to take care of the fresh growth of microbial species on textiles. The present invention aims to address the technical challenge by providing an antimicrobial composition that does not reach to the low concentration throughout lifetime of the antimicrobial textile, which is being considered as of 30 to 50 washes depending on type of textile.

Another technical challenge is a poor wash-durability of antimicrobial products on textiles caused by its inappropriately lower binding on textiles due to several underlying reasons.

Another challenge is eliminating the adverse reaction of the antimicrobial from treated textile on skin on wearing the textile, which may cause long-lasting ill-effects on skin leading to further complications.

Still another challenge is maintaining the comfortable feel of the treated textile on skin after transferring the antimicrobial on textile. Yet another challenge is in ensuring colour retention of the original textile after transferring the antimicrobial on it. Furthermore, the challenge is to ensure that the antimicrobial transferred on textile does not emit any odour or causes to generate odour.

The present invention aims to address the above technical challenges as also by providing a high wash durability of textile so that those challenges do not surface again after a few washes, which is another challenge.

Furthermore, the challenge exists that the treated textile at the end of its life-usage needs to become suitably compatible towards its bio-degradation if intended and attempted.

All the above challenges need to be met simultaneously to attain safety and not in exclusive manner by preferring to resolve one or two over the remaining challenges. The present embodiment offers the solution of all these challenges as being the claims thereof.

Therefore, the present invention provides an antimicrobial composition demonstrating almost permanent binding, non-leaching, no skin toxicity, no skin aberration, no nasal toxicity and high wash durability up to usable life of the textiles. Also, the aim is to ensure these safe features of the antimicrobial composition while the process of transferring the antimicrobial on textile is being carried out.

Generally, an antimicrobial agent is classified as biocidal or biostatic depending on the mode of action and mechanism against micro-organisms. The biocidal antimicrobial agents kill the micro-organisms, whereas the biostatic antimicrobial agents restrict growth of micro-organisms which eventually kills the micro-organisms. It may be pertinent to note that the mode of action of the antimicrobial agent is directly related to the concentration of an active substance in the textile. Further, the mode of action is also related to a surface concentration as per the weave and nature of the textile. In one example, a uniform presence of antimicrobial agents may be desirable to obtain a uniformly treated antimicrobial surface. Further, the uniform presence of the antimicrobial may be achieved by using a suitable antimicrobial composition. Apart from the antimicrobial composition, the method used for transferring the antimicrobial on the article is also crucial to ensure appropriate binding of the antimicrobial and the article. In one example, the article to be treated with the antimicrobial may be a textile.

Further, the transfer of the antimicrobial on the article may require additional components such as a binding agent or a binder. In one example, the transfer of the antimicrobial on the textile may be carried out using a uniform method for surface with help of a binding agent. In one example, a textile may be treated with an antimicrobial in a textile-processing unit, to create antimicrobial text.

In other aspect, the antimicrobial agent may also be classified as leaching antimicrobials and bound antimicrobials. The antimicrobial agents may also be classified as a finishing agent and a barrier forming antimicrobial. The finishing agent as also barrier forming antimicrobial may show gradual release of the antimicrobial agent from the textile treated with the antimicrobial agent. It may be understood that 'Gradual Leaching' of the conventionally used antimicrobials in treated textiles, which is factually observed, is being called as 'Controlled Release of the Antimicrobial' from the treated textiles, but without providing any scientific mechanism of the release as also exactly reproducible quantum of the antimicrobial from the controlled release, to term it as being 'Controlled Release'. The barrier forming antimicrobial may form a barrier to approaching microbes on treated textile.

It may be understood that the claimed controlled release of the antimicrobial from the textile into the surroundings and especially in water or on human skin may have negative effects. Further, decomposition of the conventional antimicrobial agents on textiles has also been reported. The decomposed products of an antimicrobial in usage may exhibit higher toxicity too. Also decomposed products may vary in their nature and in chemistry depending on process leading to them, and hence also toxicity. The decomposition may occur chemically or by microbial action post forming treated textile or even post release of the antimicrobial from the treated textile.

In another aspect, the antimicrobial agents may be chemically bound to the textile fibres acting as the barrier forming antimicrobial and controlling micro-organisms immediately on contact at a fibre surface. It may be understood that the barrier forming antimicrobials may not leach into the surroundings of the textile, thereby avoiding side effects of the finishing antimicrobial agent as mentioned above. Therefore, there is a need to develop an antimicrobial composition capable of uniform and strong binding to any article or surface.

Further, the antimicrobial composition may not be non-leaching in nature, thereby avoiding environment pollution. It may be understood that the antimicrobial composition should be highly wash durable as well. In such attempts, one of the primary objectives may be to confirm anti-microbial activity of a material against a wide range of microbial species.

The present invention provides an antimicrobial composition to inhibit a microbial growth on a textile treated with the antimicrobial composition and a method to synthesize the same. The antimicrobial composition is commercially favourable and has been arrived at after multiple variations in the reactant compositions and the reaction conditions to obtain a stable, strong covalent binding on different types of textiles, and giving durable antimicrobial textile. Further, the antimicrobial composition may be understood to form a stable suspension/dispersion for application on textiles. In one example, the antimicrobial composition may be transferred to the textile during a certain process-stage of the textile. The antimicrobial composition may most preferably be transferred to the textile at the last stage. In another example, the antimicrobial composition may be coated on any article such as surgical masks, aprons, apparels, gloves to make the article antimicrobial in nature. Further, the antimicrobial composition may be used for various synthetic woven articles as well. The antimicrobial composition may be derived from a quaternary ammonium sat (QAS), a binder, and a stabilizing agent.

The antimicrobial composition may be synthesized using the QAS. The QAS may comprise one or more of a didecyl dimethyl ammonium chloride, a dioctyl dimethyl ammonium chloride, an ethyl benzyl dimethyl ammonium chloride, a lauryl myristyl dimethyl ammonium chloride and a combination thereof. In one example, the QAS may be didecyl dimethyl ammonium chloride. In other example, the QAS may be a combination of dioctyl dimethyl ammonium chloride, and ethyl benzyl dimethyl ammonium chloride. Further, the QAS may also comprise one or more of a cetyl dimethyl ammonium bromide, a dioctyl dimethyl ammonium sulphate, an octyl decyl dimethyl ammonium chloride, and a pyridium quaternary ammonium compound (QUAT).

Furthermore, each of the QAS may be used in a 5% to 15% (w/w) aqueous solution form or a solution containing a small part of higher glycolic solvents. In one example, the QAS may be a 10% (w/w) solution of cetyl dimethyl ammonium bromide. In other example, the QAS may be a 12% (w/w) solution of octyl decyl dimethyl ammonium chloride. In yet another example, the QAS may be a 5% (w/w) solution of pyridium quaternary ammonium compound (Py-QUAT). Further, the antimicrobial composition may comprise of the binder. The binder may be selected from a group of reactive polymeric compounds comprising an acrylic polymer, a modified acrylic polymer, reactive polyhexamethylene biguanide (PHMB), aqueous polydiallyl dimethyl ammonium chloride (DADMAC) polymer, an aliphatic polyurethane, and a combination thereof.

Further, the binder may be selected from a group of acrylate, cyanoacrylate, poly vinyl acrylate, methacrylate, polyurethane polymers or a combination thereof. In one example, the binder may be an acrylic polymer. In other example, the binder may be the modified acrylic polymer and the aliphatic polyurethane. In yet another example, the binder may be the aqueous polydiallyl dimethyl ammonium chloride (DADMAC) polymer.

It may be understood that the binder may be used in a 15% to 25% (w/w) aqueous solution form. In one example, the binder may be the modified acrylic polymer in a 15% (w/w) aqueous solution form. In other example, the binder may be the aliphatic polyurethane in a 23% (w/w) aqueous solution form.

Further, the antimicrobial composition may comprise the stabilizing agent. The stabilizing agent may be selected from a group of glycol and glycol ethers comprising propylene glycol, polyethylene glycol, dipropylene glycol, butyl cellosolve and a combination thereof in certain proportion. The proportion may be 1:1 to 1:5. The proportion may be derived by using a premixing technique, and a sequential addition technique. The sequential addition technique may be preferred to maintain a uniformity and a stability of the antimicrobial composition. Further, the antimicrobial composition may precipitate out and may not remain soluble thereafter under certain sequential addition techniques. In one example, the precipitated antimicrobial may be used for application on the article of choice. The article of choice may be the fabric, and the textile. It may be understood that depending on the nature of the textile, different application method may be used to treat the textile with the antimicrobial composition.

In one example, the antimicrobial composition may be added to the textile while the textile is being manufactured. In other example, the antimicrobial composition may be added on the textile after manufacturing it. In other words, the antimicrobial composition can be added as a coating to the textile at any stage to form a antimicrobial textile. Further, the antimicrobial textile may be tested after treatment with the antimicrobial composition for an antimicrobial activity. Furthermore, the antimicrobial textile may be washed for a first time and post washing the antimicrobial activity may be tested using standard methods. Subsequently, the antimicrobial textile may be washed 'n' number of times, where value of n is more than 1. Further, the antimicrobial activity may be calculated after every wash and compared. In one example, the antimicrobial textile prepared by treating with the antimicrobial composition as mentioned in the present invention demonstrated more than 98% antimicrobial activity after 30 washes (n=30).

In one example, the solute selected may be propylene glycol. In other example, solute selected may be polyethylene glycol, dipropylene glycol, polypropylene glycol having different ethereal linkages and different polarities. Yet in another example, the solute may be an active blend of multiple glycols in certain proportion to each other as becoming stabilizing agent. Further, the stabilizing agent may be used in a 5% to 14% (w/w) concentration.

In one embodiment, the antimicrobial composition may be combined with a surfmer. The surfmer may be understood to be a polymer with different polarity and a surface-active agent in a reacted form.

Further, the antimicrobial composition may be understood to be biocidal and biostatic in nature depending on the micro-organisms.

In one embodiment, the antimicrobial composition may be applied to a cloth, a fabric/textile and an apparel. The antimicrobial composition may be applied to the cloth, the fabric and the textile during a manufacturing process of the cloth, the fabric, and the textile-aparel. Alternatively, the antimicrobial composition may be applied as the finishing agent to the cloth, the fabric and the textile after the manufacturing process.

During the manufacturing process of the textile, a plurality of fibres are spun together to form a thread. In one example, each of the fibre may be $\frac{1}{20}^{th}$ of 1 mm in size. It may be understood that a spinning oil is added to the plurality of fibres in a spin finish step to form the thread. Further, the antimicrobial composition as described in the present invention may be added with the spinning oil to the plurality of fibres during the spin finish step. Further, a plurality of threads may be joined together to form a textile. Further, a capillary action may develop in between the threads of the textile, resulting in a capillary movement of the antimicrobial composition between the threads across the textile.

It may be understood that the antimicrobial composition disclosed in present invention may assist in preventing microbial growth on any objects and surfaces covered with the antimicrobial composition. While aspects of described method for formulating the antimicrobial composition may be implemented in any number of different chemical reactant systems, environments, and/or compositions, the embodiments are described in the context of the following exemplary system.

The present disclosure is principally based on the interactions between the QAS, the binder, the stabilizing agent and the surfmer. It may be understood that different variations of reactants and reaction conditions may be followed before arriving at an optimal reaction. Similarly, the QAS, the binder, the stabilizing agent, and the surfmer may be tested in various permutations and combinations to identify best yielding combinations.

Referring now to FIG. 1, a method 100 for formulating an antimicrobial composition is disclosed in accordance with an embodiment of the present subject matter. The order in which the method 100 is described is not intended to be construed as a limitation, and any number of the described method-blocks can be combined in any order to implement the method 100 or alternate methods for formulating an antimicrobial composition.

Additionally, individual blocks may be deleted from the method 100 without departing from the scope of the subject matter described herein. Furthermore, the method 100 formulating an antimicrobial composition can be implemented with any suitable chemical reactants, alternatives of the reactants or combination thereof. However, for ease of explanation, in the embodiments described below the method 100 may be considered to be implemented as described in the method 100 for formulating the antimicrobial composition.

At block 102, a quaternary ammonium salt (QAS) may be treated in a reaction mixture. The QAS may be one or more of didecyl dimethyl ammonium chloride, dioctyl dimethyl ammonium chloride, ethyl benzyl dimethyl ammonium chloride, cetyl dimethyl ammonium bromide, and dioctyl dimethyl ammonium sulphate, octyl decyl dimethyl ammonium chloride, pyridium QUAT, and a combination thereof. It may be noted that the reaction mixture is aqueous in nature. Further, the QAS may be treated a first temperature of 40° C. to 50° C. for a first time interval of 1 to 4 hours.

At block 104, the QAS may be reacted with one or more binder in the reaction mixture. The binder may be a reactive polymeric compound, an aqueous aliphatic polyurethane emulsion, an aqueous acrylic polymer, a modified acrylic polymer, a methacrylate polymer, a reactive polyhexamethylene biguanide (PHMB), an aqueous polydiallyl dimethyl ammonium chloride (DADMAC) polymer, and a combination thereof. The molecular weight of the binder may be lower than a threshold value. It may be noted that the threshold value is 2000. Therefore, the molecular weight of the binder may be less than 2000. Further, the QAS may be reacted at a second temperature of 65° C. to 75° C. for a second time interval of 2 to 4 hours.

At block 106, the reaction mixture may be stabilized with one or more stabilizing agent. The stabilizing agent may be selected from a group of glycol. Further, the reaction mixture may be stabilized at a third temperature of 40° C. to 60° C. for a third time interval of 1 to 3 hours.

Furthermore, the method 100 may also comprise adding the antimicrobial composition into a textile to synthesize an antimicrobial textile. The antimicrobial composition may be sprayed or applied on a surface of an object to protect the object from a microbial growth. Further, the method 100 may also comprise a quantitative assessment of the antimicrobial activity and a microbiological analysis. The microbiological analysis may be performed before washing the antimicrobial textile and after each wash of the antimicrobial textile. Further, the quantitative assessment and the microbiological analysis may determine the antimicrobial activity of the antimicrobial textile.

In one embodiment, following standard methods may be used for the quantitative assessment of activity: a] ISO-AATCC TM100-2019 standard method for antibacterial testing of fabric; b] ISO-20743 (EN) 2020 textiles determination of antibacterial activity of textile products; c] ISO-18484 (EN) 2019 textiles determination of antiviral activity of textile products; d] JISL-1902; 2008 evaluation of antibacterial activity quantitative absorption method.

In one example, the antimicrobial composition may be found to be effective against a wide range of pathogenic microbes including several bacteria, viruses, protozoans, and fungi.

EXPERIMENTS AND RESULTS

Example 1

In order to explain the method for formulating the antimicrobial composition in more detail, consider below experiments performed with a quaternary ammonium salt (QAS) as an exemplary embodiment in accordance with the present subject matter. Different constituents may be used in the method. In one example, 10% (w/w) octyl decyl dimethyl ammonium chloride aqueous solution may be used as the QAS.

Further, the QAS may be treated in a reaction mixture at a temperature of 45° C. for a first time interval of 02 hours. Furthermore, the QAS is reacted with a binder. The binder used is a 15% (w/w) methacrylate polymer aqueous solution. The QAS and the binder are reacted on a second temperature of 70° C. for a second time interval of 3 hours.

Finally, the reaction mixture of the QAS and the binder is stabilized with 10% aqueous solution of propylene glycol as a stabilizing agent. The QAS, binder are stabilized at a third temperature of 50° C. for a third time interval of 3 hours. The resultant product is further diluted with water thereby forming the antimicrobial composition.

Further, the antimicrobial synthesized can be used in finishing a manufactured textile, an apparel converting an ordinary textile to an antimicrobial textile. The antimicrobial textile can be a curtain. Further, the antimicrobial activity of the curtain may be analysed after the antimicrobial composition is applied to the textile. Further, the curtain may be used and washed. After the use and the wash, the antimicrobial activity can be again determined. In one such embodiment as per the given example, the antimicrobial activity was found to be 99.99% after 30 number of washes. Therefore, the antimicrobial composition is suggested to be highly stable with high wash durability and 0% leaching.

Several challenges faced in developing an antimicrobial composition ideal for the antimicrobial textiles of daily wear have been overcome using the present invention successfully.

One embodiment of the present invention provides long lasting antimicrobial properties of treated textiles showing the activity against a wide range of damage-causing microbial species including fungi, bacteria and viruses. Therefore, the challenge to ensure antimicrobial activity in the mixed presence of multiple microbial species existing together has been addressed.

Furthermore, one other embodiment of the present invention demonstrated that the antimicrobial is infinitely soluble in water but does not leach out once transferred on textiles, and hence it does not enter into environment with each washing caried out on treated textile.

Further, the antimicrobial activity of treated textile has been shown to be unaffected even after 30 to 40 washes of textile. Therefore, the present invention provides an antimicrobial composition which exhibits minimum or no leaching from treated textile by sweat too while the textile is on body for long time; thereby it is friendly to human and environment.

Subsequently, it has been observed that the antimicrobial activity of treated textile does not reach to a low concentration at any time throughout lifetime of the antimicrobial textile, which is being considered as of 30 to 50 washes depending on type of textile. Therefore, any possibility of microbe developing resistance towards the antimicrobial and thereby growing on once-treated but often washed-textile has been eliminated.

Further, the treated textile shows high wash-durability of the order of more than 30 washes. It may be understood that the high wash-durability is an attribute that the cationic antimicrobial on the treated cloth is not getting fouled by its reaction with anionic soaps used for the washing of the said treated textile.

Furthermore, the textile having treated by antimicrobial composition has also been tested for an allergic or an adverse reaction on human skin. It may be understood that no adverse reaction was induced by the antimicrobial composition on human skin after wearing the textile. Therefore, the antimicrobial composition may be considered safe for use in apparels, daily wear, towels, and the like.

Further the textile treated with the antimicrobial composition has also been observed to have overall comfortable feel on human skin after transferring the antimicrobial on textile and getting washed thereafter. The antimicrobial composition does not lead to development of hardness, loss of tensile strength or a change of colour, or loss of appeal of the textile, and that, those properties of original textile get retained even after repeated washings In one example, the antimicrobial textile i.e. the textile with the antimicrobial composition transferred or coated on the textile was tested for any odour coming from it. It may be noted that no particular odour or smell was imparted to the textile. On the contrary, due to antimicrobial characteristics of treated textile, odour-causing microbes cannot dwell on treated textiles, therefore the used textile does not generate foul odour. It has been demonstrated that it is easy to impart pleasing fragrance to the treated textiles though this treatment composition. It may be noted that the fragrance is also getting retained up to 30 washes of the antimicrobial textile.

Furthermore, the antimicrobial textile has been found to be biodegradable when such textile reaches a stage of worn-out on receiving repeated washing.

The present embodiment offers the solution of all technical challenges faced in use of conventional antimicrobial products, as mentioned in the following claims.

Therefore, the present invention provides an antimicrobial composition for mass-production of treated textiles demonstrating: its long lasting binding to the textile, non-leaching in environment, no skin toxicity, no skin aberration, no nasal toxicity and high durability for wearing it up to its usable life, by following the process of transferring the antimicrobial composition on the textile.

Exemplary embodiments discussed above may provide certain advantages. Though not required to practice aspects of the disclosure, these advantages may include those provided by the following features.

Some embodiments of the method provide an antimicrobial composition for all kinds of commonly used apparels.

Some embodiments of the method provide an antimicrobial composition for surgical masks, PPE kits, aprons, and gloves used by doctors, nurses, medical professionals.

Some embodiments of the method provide an antimicrobial composition for curtains, bedsheets, pillow covers used in hospitals, laboratories, and ambulances.

Some embodiments of the method provide an antimicrobial composition for creating virus resistant fabrics.

Some embodiments of the method may prevent transmission of bacterial, viral, and fungal infections.

Although implementations for methods for creating an antimicrobial composition for usage on textile have been described in language specific to structural features and/or methods, it is to be understood that the appended claims are not necessarily limited to the specific features or methods described. Rather, the specific features and methods are disclosed as examples of implementations for formulating an antimicrobial composition.

We claim:

1. A method for formulating an antimicrobial composition, the method comprising:

treating a quaternary ammonium salt (QAS) in a reaction mixture, wherein the reaction mixture is aqueous in nature, and wherein the QAS is treated at a first temperature of 40° C. to 50° C. for a first time interval of 1 to 4 hours, and wherein the QAS provides an ammonium cation to bind to an anionic site in a controlled environment and wherein a polar hydrogen in the QAS is capable to attach to a binder, and wherein the QAS is a 10% to 15% (w/w) aqueous solution in the reaction mixture, and the QAS comprises one or more of dioctyl dimethyl ammonium chloride, cetyl dimethyl ammonium bromide, dioctyl dimethyl ammonium sulfate, and a combination thereof;

reacting the QAS with a 15% to 25% (w/w) aqueous solution of the binder in the reaction mixture, wherein the binder is a reactive polymeric compound and wherein a molecular weight of the binder is lower than a threshold value of 2000, and wherein the QAS is reacted at a second temperature of 65° C. to 75° C. for a second time interval of 2 to 4 hours, and wherein the binder binds to the QAS in the controlled environment;

wherein the binder comprises one or more of an aqueous aliphatic polyurethane emulsion, and an aqueous polydiallyl dimethyl ammonium chloride (DADMAC) polymer; and stabilizing the reaction mixture with a stabilizing agent, wherein the stabilizing agent is selected from at least one of a group of glycol and glycol ethers, and wherein the reaction mixture is stabilized at a third temperature of 40° C. to 60° C. for a third time interval of 1 to 3 hours, and wherein the stabilizing agent is added in a 5% to 14% (w/w) concentration in the reaction mixture, thereby formulating the antimicrobial composition to be applied on one of a cloth, a fabric and a textile, wherein the antimicrobial composition is biocidal and biostatic.

2. The method as claimed in claim 1, wherein the QAS further comprises one or more of didecyl dimethyl ammonium chloride chloride, ethyl benzyl dimethyl ammonium chloride, octyl decyl dimethyl ammonium chloride, a pyridinum-quaternary ammonium compound, and a combination thereof.

3. The method as claimed in claim 1, wherein the binder further comprises at least one of an aqueous acrylic polymer, a modified acrylic polymer, a methacrylate polymer, and a reactive polyhexamethylene biguanide (PHMB).

4. The method as claimed in claim 1, wherein the quaternary ammonium salt is combined with a surfmer, wherein the surfmer is a polymer with a surface-active agent in a reacted form.

5. The method as claimed in claim 1, wherein the antimicrobial composition is applied to a cloth, a fabric and a textile, and wherein the antimicrobial composition provides antiwrinkle property, and wherein the antimicrobial composition imparts fragrance to the cloth, the fabric, and the textile.

6. An antimicrobial composition to be applied on one of a cloth, a fabric and a textile, the antimicrobial composition comprising:

a quaternary ammonium salt (QAS) comprising one or more of dioctyl dimethyl ammonium chloride, cetyl dimethyl ammonium bromide, dioctyl dimethyl ammonium sulfate, and a combination thereof, wherein the QAS is in a 10% to 15% (w/w) aqueous solution form in the antimicrobial composition;

a binder comprising one or more of an aqueous aliphatic polyurethane emulsion, and an aqueous polydiallyl dimethyl ammonium chloride (DADMAC) polymer, wherein the binder is in a 15% to 25% (w/w) aqueous solution form in the antimicrobial composition and wherein a threshold value is 2000; and a stabilizing agent, wherein the stabilizing agent is in a 5% to 14% (w/w) concentration in the antimicrobial composition, wherein the antimicrobial composition has biocidal and biostatic properties.

* * * * *